(12) United States Patent
Schmidt et al.

(10) Patent No.: US 6,860,167 B2
(45) Date of Patent: Mar. 1, 2005

(54) TRANSMISSION FOR A STABILIZER ARRANGEMENT FOR A MOTOR VEHICLE CHASSIS

(75) Inventors: Roland Schmidt, Stockdorf (DE); Thomas Kautz, Kammerberg (DE); Torsten Wey, Duisburg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 185 days.

(21) Appl. No.: 10/190,615

(22) Filed: Jul. 9, 2002

(65) Prior Publication Data

US 2003/0015048 A1 Jan. 23, 2003

(30) Foreign Application Priority Data

Jul. 10, 2001 (DE) .......................................... 101 33 431

(51) Int. Cl.⁷ .............................................. F16H 25/12
(52) U.S. Cl. .................... 74/56; 74/55; 74/57
(58) Field of Search ................ 74/56, 47, 48, 74/55, 57, 58, 59, 567, 569

(56) References Cited

U.S. PATENT DOCUMENTS

| | | | | | |
|---|---|---|---|---|---|
| 3,731,545 A | * | 5/1973 | Beezer | ........................... | 74/24 |
| 3,869,924 A | * | 3/1975 | Beezer | ........................... | 74/24 |
| 4,834,033 A | * | 5/1989 | Larsen | ....................... | 123/56.8 |
| 5,586,467 A | * | 12/1996 | Weber | ........................... | 74/57 |

FOREIGN PATENT DOCUMENTS

| | | |
|---|---|---|
| DE | 44 43 809 A1 | 4/1996 |
| DE | 195 48 593 A1 | 7/1997 |
| DE | 100 02 455 A1 | 7/2001 |
| GB | 1112917 | 5/1968 |

* cited by examiner

*Primary Examiner*—David M. Fenstermacher
(74) *Attorney, Agent, or Firm*—Crowell & Moring LLP (57) ABSTRACT

A transmission with an essentially unloaded neutral position includes two curved-path carriers each having a curved path and a coupling element configured to engage with the curved paths of the curved-path carriers. The coupling element includes an engaging element which engages with the curved paths of the curved-path carriers. The engaging element is biased by a prestress against the curved path of each of the curved-path carriers in the essentially unloaded neutral position of the transmission.

18 Claims, 6 Drawing Sheets

TRANSMISSION FOR A STABILIZER ARRANGEMENT FOR A MOTOR VEHICLE CHASSIS

This application claims the priority of Federal Republic of Germany Patent Document No. DE 101 33 431.1, filed Jul. 10, 2001, the disclosure of which is expressly incorporated by reference herein.

BACKGROUND AND SUMMARY OF THE INVENTION

The present invention relates to a stabilizer arrangement for a chassis of a motor vehicle, to an actuator of the stabilizer arrangement, and to a transmission which is particularly suitable for use in an actuator of a stabilizer arrangement.

It is known from prior art that so-called active stabilizer arrangements are provided on vertically movable wheel suspensions of a motor vehicle chassis. It is the object of these stabilizer arrangements to reduce rolling movements about the longitudinal vehicle axis which occur during cornering as a result of the lateral acceleration. For this purpose, two wheel suspensions pertaining to a vehicle axle are connected with one another by a stabilizer arrangement which is driven by an actuator. During the operation, a rotating movement of the stabilizer halves in the opposite direction is generated by the actuator and is transmitted by way of coupling rods to two levers or crank arms linked to one wheel suspension respectively. As a result, a compensation of the rolling movement of the vehicle body occurring during a cornering can be achieved.

The occurring load naturally takes place in opposite directions in the case of left-hand and right-hand turns. When the stabilization direction is changed, the torque of the actuator is therefore also required to be in the reversed direction. During this load change from one to the other load position, noises are generated by the play in the radial and axial direction. The change of the load positions always takes place in an area of a center position between the load positions. In the center position, the stabilizer and therefore also the transmission are almost free of torques. This change of load positions causes a change of the contact surfaces. As a result of the impacting or striking contact which occurs during a change of contact surfaces, a disturbing noise is generated. Since, when driving straight ahead or along slight bends, the actuator is always situated in this area of the neutral position, load changes and resulting noises occur frequently. In addition to the noises, this also results in increased wear of the contact areas.

German Patent Document DE 44 43 809 A1 discloses the use of a hydraulic actuator, which has idling losses, for generating the rotating movement of the stabilizer halves in opposite directions. For reducing the stress caused by noise, the two stabilizer halves are glued to the actuator, and a bearing of the stabilizer halves in rubber metal bearings is suggested for noise reduction and vibration damping.

Unpublished German Patent Application DE 100 02 455 describes an actuator for a stabilizer arrangement which is clearly simplified in comparison to known solutions. For forming an actuator, a transmission is connected with a drive in the form of an electric-motor actuating drive, a hydraulic cylinder piston unit or a similar device. Based on the recognition that a transmission in a stabilizer arrangement must be able to adjust an angle of rotation of maximally approximately 45°, this patent application discloses the use of curved-path transmissions. For adjusting an angle of rotation, a coupling element is guided simultaneously in different curved paths of two separate curved-path carriers along a common longitudinal axis. An axial displacement of the coupling element is caused, for example, by an electric-motor-driven threaded spindle, so that rotating movements of the curved-path carriers with respect to one another can be achieved in a simple and reliable manner. The rotating movements are transmitted to the respective wheel suspensions by way of the stabilizer halves which are non-rotatably mounted in each case on one curved-path carrier.

Based on a transmission and an actuator of the above-described stabilizer arrangement, it is an object of the present invention to reduce the noise caused by its operation.

According to the invention, this object is achieved by the embodiments of the present invention as described and claimed hereinafter.

A stabilizer arrangement according to the invention is therefore characterized by an actuator having a curved-path transmission in which a coupling element of the transmission has at least one element engaging in the curved paths of the curved-path carrier. The element is acted upon by prestressing such that, in an essentially unloaded neutral position of the transmission, it rests against a curved path of each of the curved-path carriers. By setting a static prestress, for example, between a drive of the actuator and the coupling element mechanically connected to the drive, the engaging element can securely rest against a curved path for each curved-path carrier, even in a neutral position.

In a preferred embodiment of the invention, at least two elements are arranged to engage two different curved paths of curved-paths carriers, and devices are provided for the spring-elastic bracing of the two engaging elements. The two engaging elements may be arranged on a common shaft, in which case the shaft includes, for example, a spring elastic material, particularly a spring steel. The shaft, made of a spring-elastic material, is preferably prestressed by a deviation from a linear connection between the two engaging elements. As an alternative or in addition, the paths of two opposite curved paths can be arranged to be mutually offset by a defined amount for generating a prestress in the shaft.

In a further embodiment, a spring-elastically constructed narrowing and/or a spring element is provided at least in the area of a neutral position on a path or flank of a curved path. In this case, the term path or flank of a curved path is the shape or line of an edge of a curved path which has a recess, an undercut, or a filling by a suitable other material, for example, by a rubber-type material, for forming a spring-elastic area according to the invention.

In an advantageous further development, a transmission according to the invention has at least two shafts with the engaging elements at the coupling element and correspondingly several complementary curved paths in the separate curved-path carriers. This creates several loading points by which the respective loading is reduced. Furthermore, in the layout, symmetries of the loading and a comparatively more favorable course of torques can be utilized in order to, for example, be able to lower the strength of the individual structural elements and/or use cost-effective materials. Thus, while the costs are lowered and the service life is increased, on the whole, a favorable course of torques is obtained in the curved-path carriers as well as in the coupling element.

In an embodiment, spring elements are arranged on the above-mentioned shaft and/or between the above-mentioned shafts for generating a prestress. Depending on the required rigidity of the spring, these may be simple coil springs constructed as tension and/or pressure springs. The shafts may, in addition, be linked to the coupling element. In other words, the shafts carrying the engaging elements are at least slightly movable with respect to the coupling element, particularly in a rotatable or swivellable manner, specifically with respect to one another with the effect of the spring element or elements.

For a significant reduction of the resistance or of the friction during the displacement of the coupling element under load, the element engaging in the curved path is constructed as a roller or a pair of rollers. Among other things, a concrete structural shape of the respective transmission should be taken into account here, particularly whether a series mounting or a superposing of the curved-path carriers is involved. These different structural shapes also are indicated in the above-mentioned non-published German Patent Application No. 100 02 455.6. When selecting the material pairings of roller material and the material of the curved paths in the contact area, under the condition of the transmission of predetermined torques while the frequency of the occurrence is statistically determined, the person skilled in the art can freely employ known materials and finished products, particularly in the area of the rollers as well as their bearing.

In a preferred embodiment of the invention, the engaging elements are braced with respect to one another such that each engaging element rests at least in the area of a neutral position against a side or flank of the path or curved path. This solution is provided particularly for the mutual bracing of the engaging elements of a spring-elastically constructed, mutually eccentrically arranged bearing of the engaging elements on a common end of the shaft. In order to generally prevent a lifting of the rollers off a respective curved path, a constant contact of the rollers on the curved paths can also be achieved by adjusting the prestress.

In a preferred embodiment of the invention, a driving unit comprises a threaded spindle on which the coupling element of an above-described transmission is axially displaceably arranged as a nut. In this case, the driving unit may be very cost-effectively constructed as an electric motor.

A transmission according to the present invention, while maintaining its above-mentioned advantages, may also be adapted in a simple manner to a use in other technical fields with corresponding problems outside the vehicle construction field.

Other objects, advantages and novel features of the present invention will become apparent from the following detailed description of the invention when considered in conjunction with the accompanying drawings.

DETAILED DESCRIPTION OF THE DRAWINGS

Figure 1:
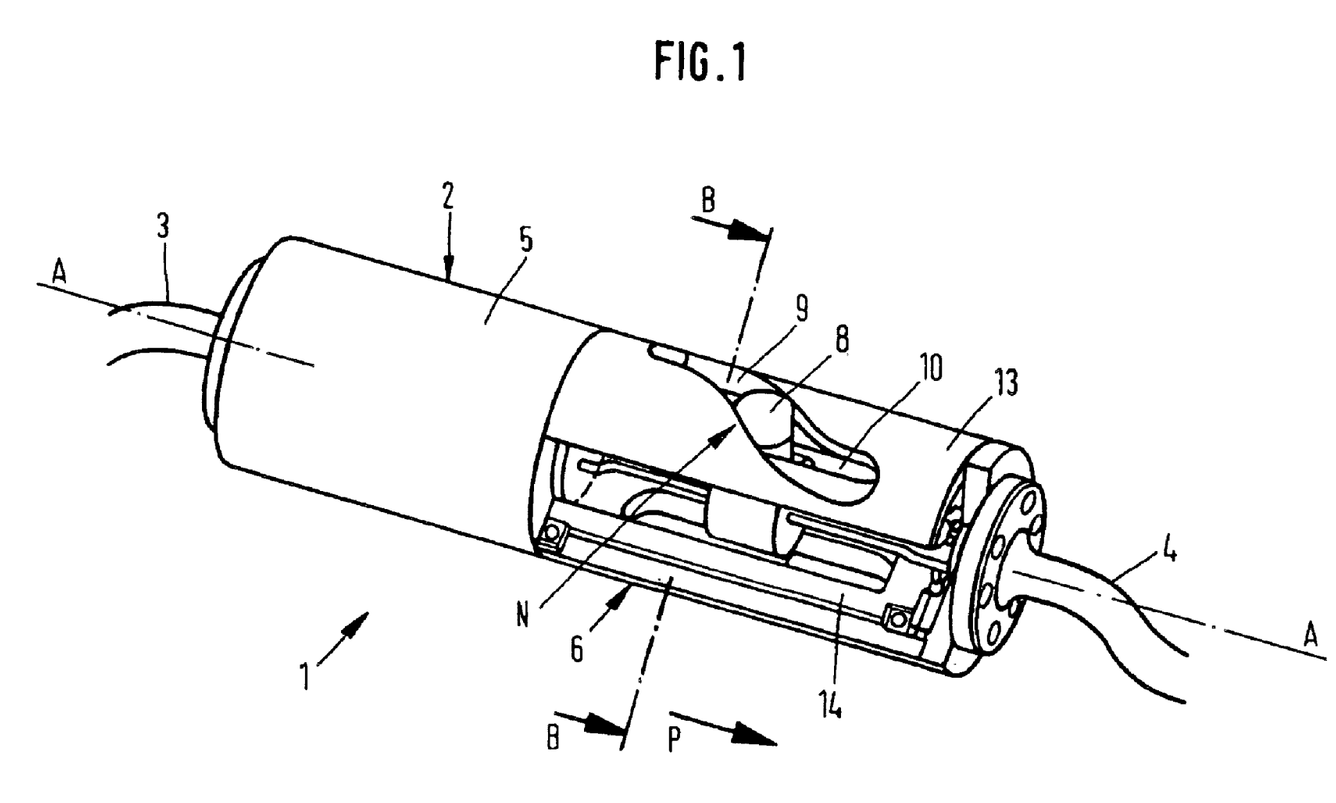
FIG. 1 is a perspective sectional view of a known stabilizer arrangement.

FIG. 1 is a partial sectional perspective view of a stabilizer arrangement of a motor vehicle, as described in German Patent Application No. 100 02 455, which is a non-published application. The stabilizer arrangement 1 comprises an actuator 2 which is connected with two stabilizer halves 3, 4 such that the stabilizer halves 3, 4 can be rotated with respect to one another by the actuator 2 in a defined manner about the longitudinal axis or axis of rotation A. The actuator 2 comprises a drive 5 and a transmission 6 which is a curved-path transmission.

In the transmission 6, a coupling element 7, which carries rollers 8, engages in different curved paths 9, 10. The first curved path 9 is provided in a first curved-path carrier 13 and the second curved path 10 is provided in a second curved-path carrier 14. As illustrated, for reducing the installation size, while the diameter of the transmission increases slightly, the curved-path carriers 13, 14, which can rotate with respect to one another about the axis of rotation/ longitudinal axis A, are arranged above one another or nesting in one another. In other words, the hollow-cylindrical curved-path carrier 14 is situated inside the hollow-cylindrical curved-path carrier 13.

Figure 2:
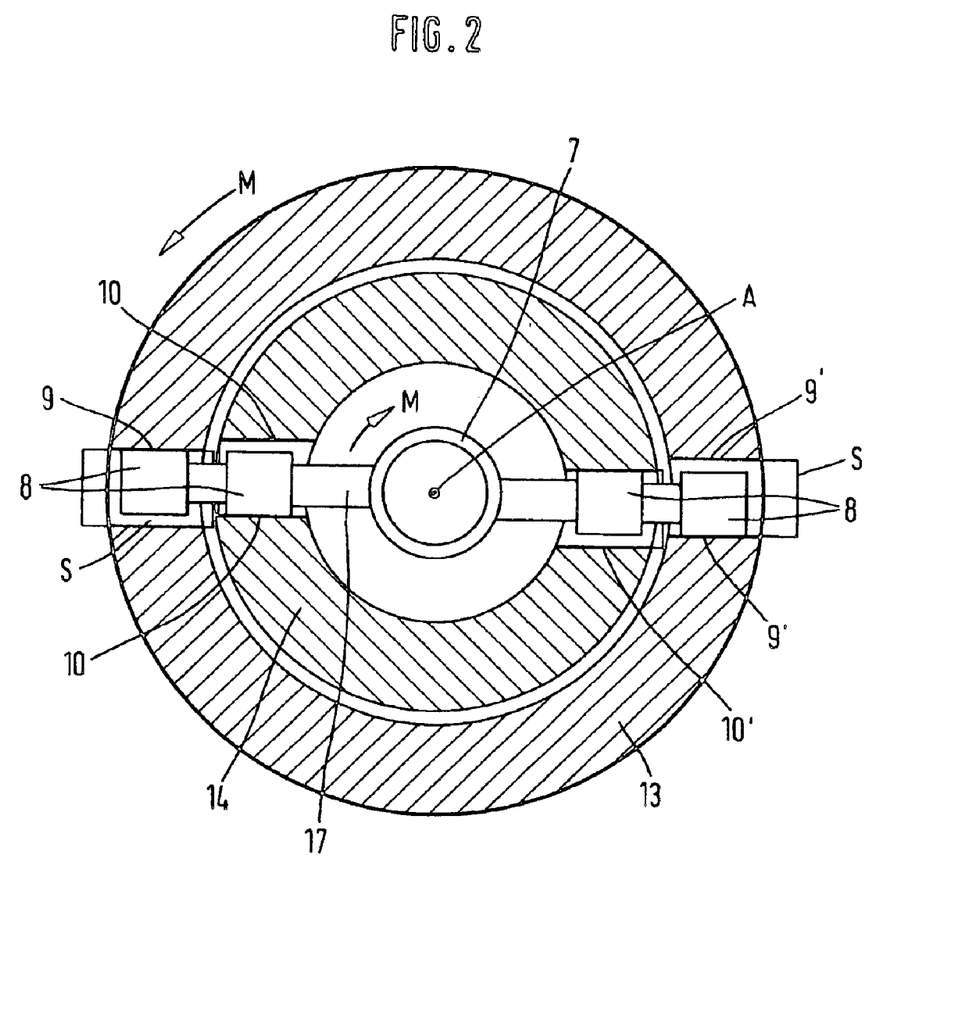
FIG. 2 is an outline of a sectional view in a plane B—B of FIG. 1.

As illustrated in the sectional view according to FIG. 2, curved paths 9, 9' and 10, 10' are provided in the curved-path carriers 13 and 14 respectively. The curved paths are mutually complementary in an opposite manner with respect to the axis of rotation A. All rollers 8 are arranged on a common shaft 17 which is connected with the coupling element 7. When a more or less high torque M is present between the two curved-path carriers 13 and 14, as illustrated in the figures, all rollers 8 rest in each case against one side or flank of the curved paths 9, 9' and 10, 10' respectively. When the torque M between the curved-path carriers 13 and 14 acts in the direction indicated by the arrows (M), the inner curved-path carrier 14 is virtually "braced" clockwise against the outer curved-path carrier 13, starting from the axis of rotation A. Viewed in each case radially to the outside in the direction of the shaft 17, the rollers 8 rest in each case against the left flank of the curved path 10 and 10' respectively, while the rollers 8 in the curved paths 9, 9' of the "outer" curved path carrier 13 each rest against the right flank of the curved path 9 and 9' respectively.

When (compare FIG. 1) the coupling element 7 is displaced in or against the direction of the arrow P, this torque M is either increased or decreased, which is naturally determined by the respective course of the curved paths 9 and 10. During a change of the stabilization direction, the torque M between the two curved-path carriers 13, 14 may be reduced by external influences, e.g., by another torque introduced by the stabilizer halves 3, 4 into the actuator 2 and thus into the curved-path transmission 6. The rollers 8 will then move through a center position between the two flanks of the curved path 9, 9', 10, 10' to the other side of the respective curved path or toward its other flank.

When the torque M is in a direction opposite to that illustrated in FIG. 2, the rollers 8 will correspondingly rest against the (according to FIG. 2) opposite side or flank of the respective curved path 9, 9' and 10, 10' respectively. In the case of the known prior described so far, this change of the contact pressure side or flank on/in the respective curved path 9, 9', 10, 10' always takes place in the area of the center position of the curved path in which the stabilizer arrangement 1 and therefore also the transmission 6 are almost free of torques.

This change of the contact surface generates a disturbing noise after the lifting off of each curved roller 8 on the respective one side of the curved path and the subsequent overcoming of a principle-caused play S (compare FIG. 2)

as a result of the impacting on the opposite side or the opposite flank of this curved path. Because, in straight-ahead driving or in slight curves, the actuator 2 is always situated in this area, this noise will occur frequently.

Measures according to the invention for reducing or avoiding these noises are described hereinafter with reference to FIGS. 3 to 6. Without limiting the scope of the protection, another construction of a transmission 6 will now also be discussed which is known in principle from German Patent Document DE 100 02 455. In this transmission, to reduce the dimensions of an actuator 2, curved-path carriers 13, 14, such as hollow cylinders, are arranged about the common axis of rotation A in a superimposed or mutually nesting manner. The engaging elements for each curved path may be rollers 8 or a pair of rollers 16 in a compact construction to reduce resistance or friction during the displacement of the coupling element 7 under load. Two pairs of rollers 16 are disposed on a shaft 17.

Figure 3:
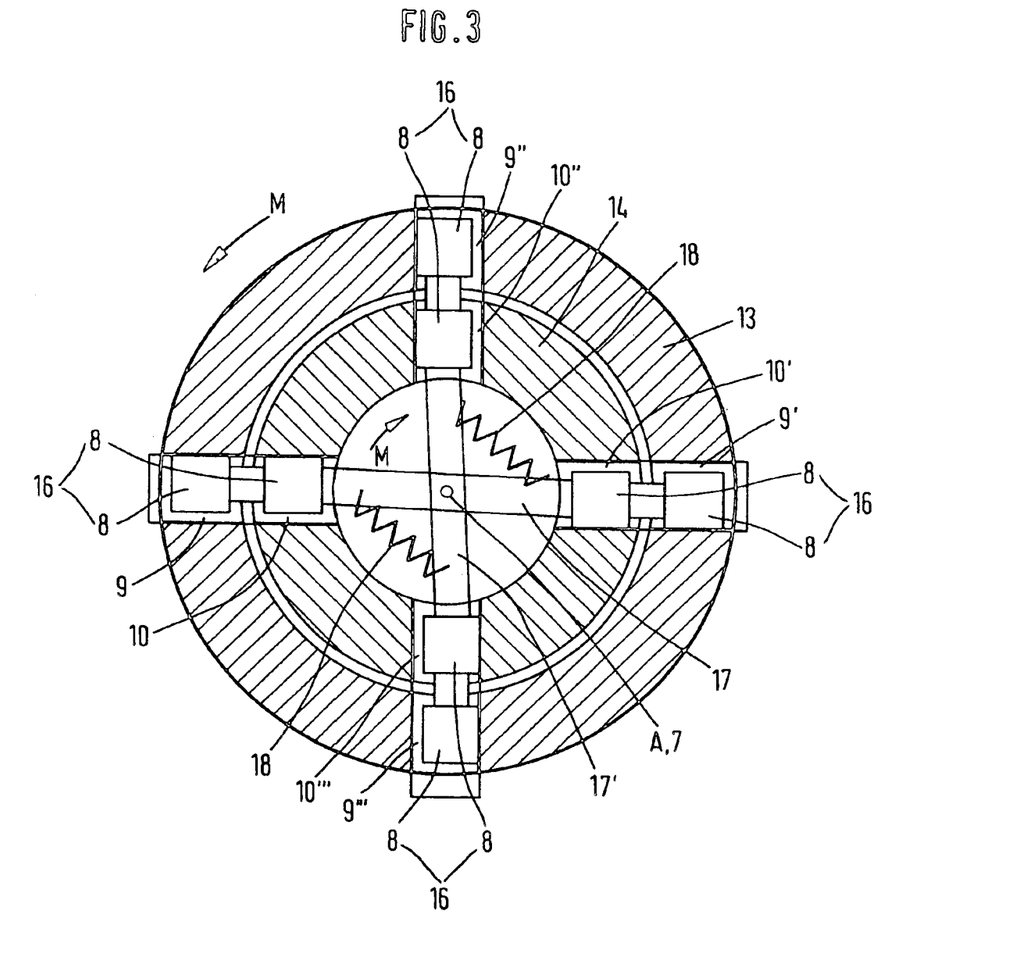
FIG. 3 is an outline of a first embodiment according to the present invention in a representation analogous to FIG. 2.
Figure 4:
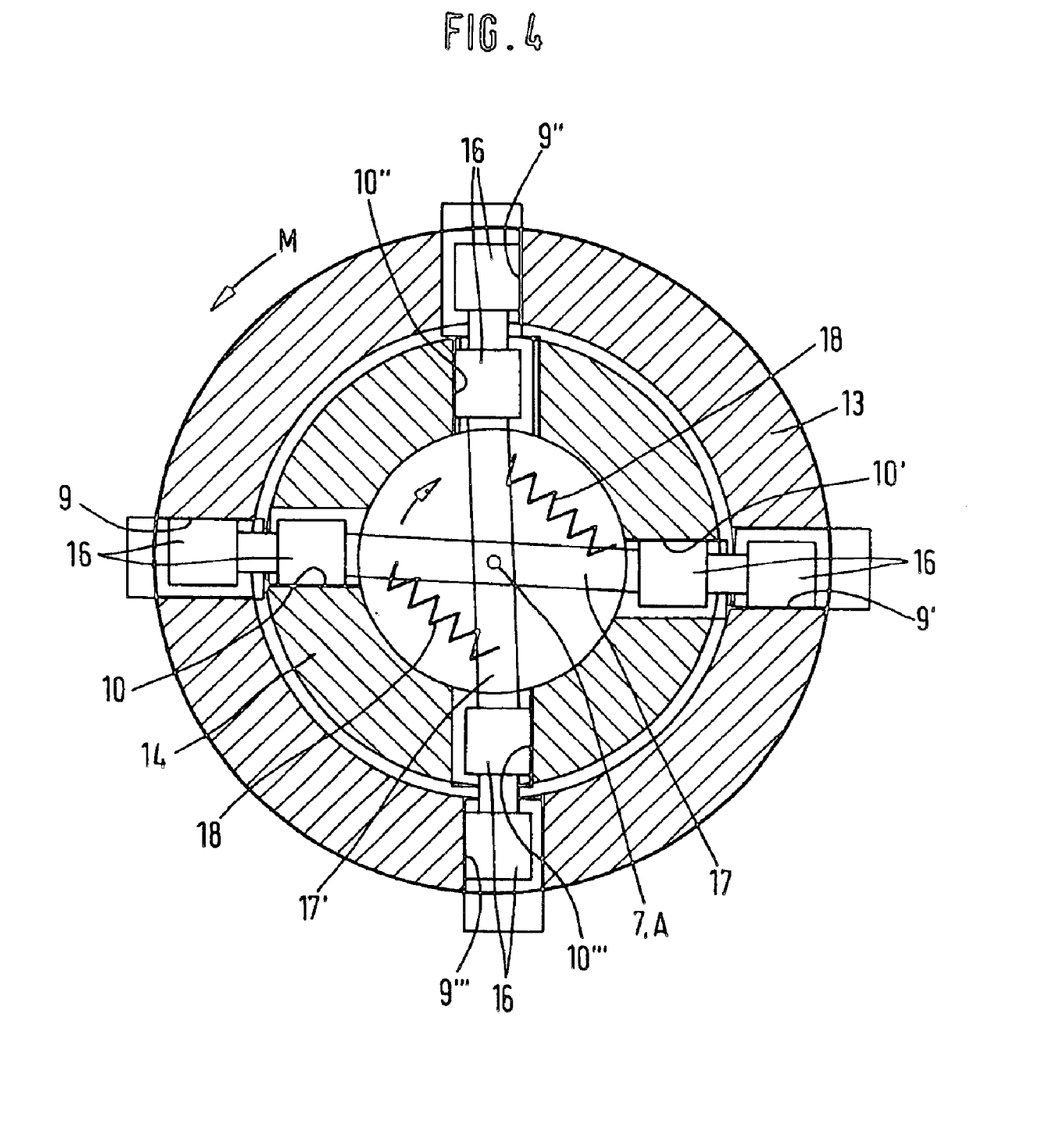
FIG. 4 is an outline of a behavior of the embodiment of FIG. 3 while the stabilizing torque is high.

In the first embodiment according to FIGS. 3 and 4, two shafts 17, 17' with rollers 8 are linked essentially perpendicularly with respect to one another to the coupling element 7. The coupling element 7 is constructed, for example, as a spindle nut and can be displaced by a threaded spindle. The threaded spindle rotates about the longitudinal axis of rotation A when driven by the drive 5 (FIG. 1) and can move in or against the direction of the arrow P along the axis. The shafts 17, 17' can now be swivelled or rotated at least slightly about the axis of rotation A with respect to this coupling element 7. Since two shafts 17, 17' are present here which each carry rollers 8 engaging in the curved paths of the curved-path transmission 6. As a result, four mutually complementary curved paths 9, 9', 9", 9''' and 10, 10', 10", 10''' are provided in the curved-path carriers 13 and 14 respectively.

In this first embodiment, spring elements 18 in the form of pressure springs are provided or clamped between the shafts 17, 17' for applying a prestress. The two shafts 17, 17' are therefore braced with respect to one another virtually in a scissors-type manner. Consequently, when there is no torque or only a slight torque M between the curved-path carriers 13 and 14, all rollers 8 rest against a flank of the respective curved paths 9, 9', 9", 9''' and 10, 10', 10", 10''' corresponding to a scissors-type tilting movement, as illustrated in FIG. 3. In other words, two opposite sectors of the curved-path carriers 13 and 14 are clamped in in a tongs-type manner by the rollers 8. However, as mentioned above, this applies only to the condition which is free of torques as well as for operating conditions with a relatively low torque M between the curved-path carriers 13, 14. In this case, only the rollers in the curved paths 9", 10', 9''', 10 are active in the engagement in a low torque transmission.

The other rollers 8 in the other curved paths 9, 9' and 10", 10''' are engaged to these curved paths only because of the pre-tension applied by the spring elements 18, but transmit no torque effective for stabilizing the rolling of the vehicle body.

If the torque M to be transmitted between the curved-path carriers 13, 14 (in this case, the vehicle rolling stabilization torque) exceeds the amount of the prestressing of the roller pairs 16, all roller pairs 16 or all rollers 8 come to rest on the respective curved-path flanks, as illustrated in FIG. 4. The point of change of contact surface (that is, the transition from the condition according to FIG. 3 to that of FIG. 4) is therefore displaced by the prestress. The point is changed from a neutral position N (as explained in connection with the known prior art according to FIG. 2) into a range of higher torques M between the curved-path carriers 13, 14.

However, operating conditions, under which such higher torques M takes place, occur much less frequently than near torque-free operating conditions because the actuator 2 moves predominantly in a neutral area. For this reason, the described change of the contact surfaces or contact flanks in the curved paths occurs considerably less frequently in a transmission or stabilizer arrangement according to the invention than the prior art arrangement according to FIG. 2. In addition, the change of the contact surfaces as a function of the spring rigidity takes place relatively slowly and thus with less noise and also comparatively less wear than in the case of the known prior art. In an alternative embodiment, instead of two spring elements 18, a single spring element or spring elements of a different type may be provided in order to achieve the desired prestress on the rollers 8 or on the elements guided in the curved paths 9, 9', . . . , 10, 10', . . . .

In an embodiment of the invention which is not shown in detail, an analogous effect is achieved using elements or rollers resting in the neutral position on the curved paths or on their flanks by a suitable prestressing. As a result, the courses of two opposite, complementary curved paths are each mutually offset by a defined amount in the two curved-path carriers 13 and 14. In an embodiment shown in FIG. 2, the curved path 9' would therefore be slightly laterally offset with respect to the curved path 9. For example, on the left side between the centers of the curved paths 9, 9', the angle is 178°, while on the right side, the curved-path carrier 13 describes an angle of 182°. The corresponding situation also applies to the curved paths 10, 10'. Here, this "lateral" offset may either be provided only in the center area of the curved paths (the neutral position N of the transmission 6), in which a low torque exists between the curved-path carriers 13, 14. Alternatively, this "lateral" offset may extend along the entire length of the curved paths 9, 10, etc. Such an offset definitely braces the shaft 17 (or possibly the several shafts 17) at the coupling element 7 in each case to a defined extent.

Figure 5:
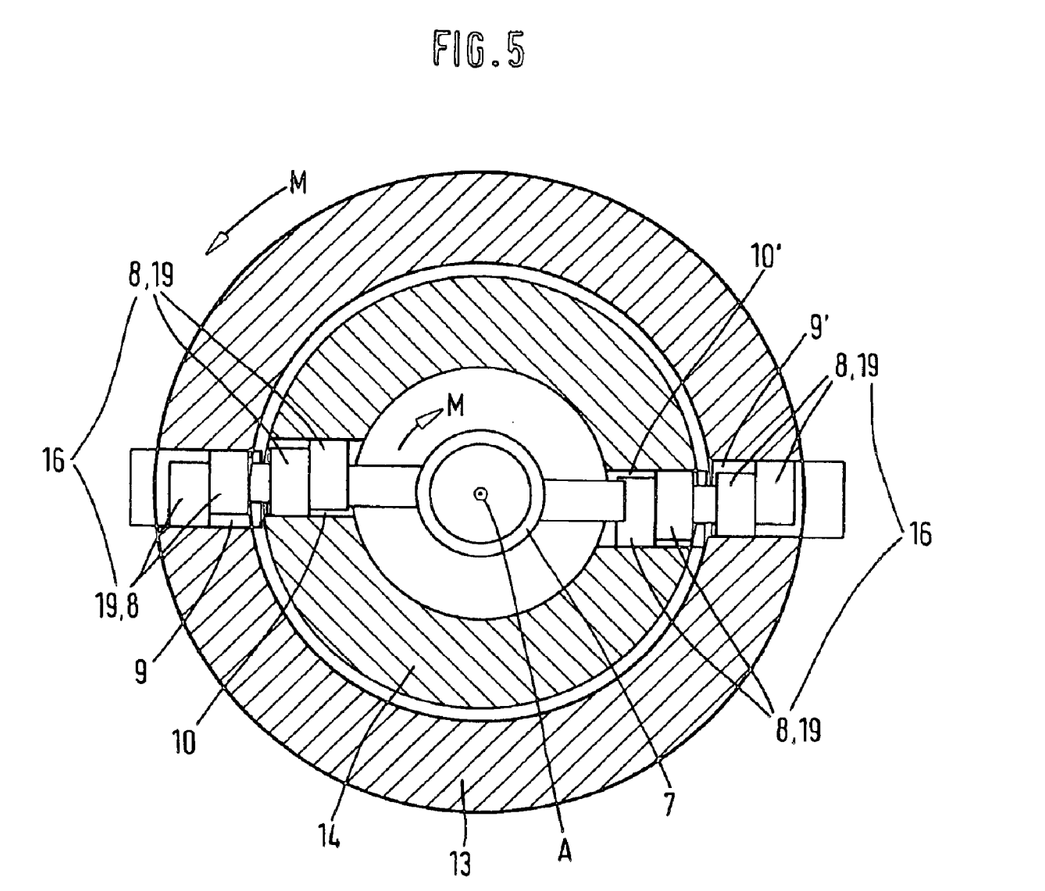
FIG. 5 is an outline of a second embodiment according to the present invention in a representation analogous to FIG. 2.

FIG. 5 shows another possible embodiment of the present invention, in which there are only two curved paths 9, 9' and 10, 10' for each curved-path carrier 13 and 14. In this embodiment, there are a pair of rollers 19 in each curved path. The rollers 8 of each pair are braced with respect to one another in a suitable manner, by the eccentric bearing on the same end of the shaft 17 such that each roller 8 always rests in each case on a side or flank of the respective curved path. The spring rigidity within this prestressing can in this case be adjusted by the selected material for the rollers 8 and/or an area or section of the shaft 17 between the rollers 8 such as a torsion spring. Thus, in contrast to the embodiment shown in FIGS. 3, 4, there is no transition between the curved-path flanks (i.e., there is no flank change), because the contact between the rollers 8 and the respective curved path flanks is maintained in all circumstances independently of the size of the torque.

Figure 6:
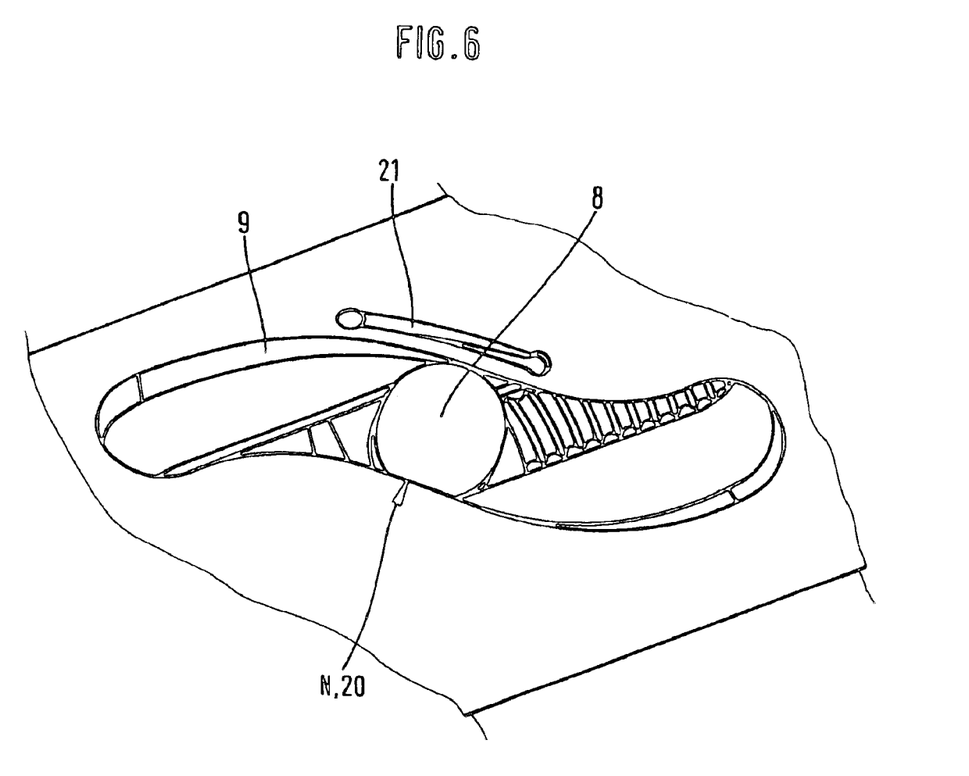
FIG. 6 is a perspective view of a third embodiment according to the present invention.

Another alternative embodiment of the present invention is illustrated in FIG. 6. By cutting free a space 21 behind or adjacent to a curved path (for example, the curved path 9) in the curved-path carrier and utilizing the elasticity of its basic material, an elastic tapering or narrowing 20 of the corresponding curved path is created. This is implemented preferably in the neutral area. In the illustrated embodiment, the roller 8 is now slightly clamped so that no play at all can occur about the neutral position N. Among other methods, by the spraying-behind using a suitable elastic material, the spring rigidity can be adjusted. The respective side or flank of the curved path therefore has an elastic design. This effect can also either be provided only in the central "neutral" section of a curved path, or it may extend along the entire length of a curved path (9, 9' . . . , 10, 10', . . . ), preferably by inserting an elastic plastic material with or without a steel skin for the running surface and/or using a separate spring element, for example, made of steel.

In addition to the embodiments described so far, a large number of additional possibilities exist for achieving the effect according to the invention. Specifically, the elements (rollers 8) guided in the curved paths 9, 10 etc. can be subjected to prestress such that, in an essentially unloaded neutral position N of the transmission 6, they rest against a curved path, more specifically against its flank or side. This prestressing may also be applied at the coupling element 7 itself, in addition, also at the shaft or the shafts 17, particularly when the shaft (at least in sections) includes a spring-elastic material. This embodiment as well as all above-described embodiments have in common that a change of a roller 8 (or generally of an element guided in a curved path) from one side or flank of the curved path to the other side or flank is prevented or is displaced into an area in which generally the transmission, and particularly the stabilizer arrangement 1, are not free of torque. A passing through this so-called displaced area is significantly less frequent than a passing through a neutral area. The noises occurring at the actuator 2 are considerably reduced by this measure and, in addition, wear is clearly reduced which occurs in the course of a frequent impacting of the rollers on the curved paths.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A stabilizer arrangement for a chassis of a motor vehicle, the stabilizer arrangement comprising:
    an actuator including
        a transmission having an essentially unloaded neutral position, the transmission including
            two curved-path carriers each having a first curved path, and
            a coupling element configured to engage with the first curved paths of the curved-path carriers, the coupling element including an engaging element which engages with the first curved paths of the curved-path carriers, the engaging element being biased by a prestress against the first curved path of each of the curved-path carriers in the essentially unloaded neutral position of the transmission; and
        a drive operatively associated with the coupling element for the displacement along a longitudinal axis common to the coupling element and the curved-path carriers.

2. The stabilizer arrangement according to claim 1, wherein the transmission further includes an additional engaging element, wherein each curved-path carrier has a second curved path, and the additional engaging element engages with the second curved paths.

3. The stabilizer arrangement according to claim 2, wherein the engaging elements are arranged on a shaft, the shaft comprising a spring-elastic material.

4. The stabilizer arrangement according to claim 3, wherein the shaft comprises spring steel.

5. The stabilizer arrangement according to claim 3, wherein the shaft is prestressed by a deviation from a straight line connection between the engaging elements.

6. The stabilizer arrangement according to claim 2, wherein the first and second curved paths are opposite to each other and are offset by a defined amount to generate the prestress in the shaft.

7. The stabilizer arrangement according to claim 2, wherein the coupling element includes two shafts each having at least one engaging element, and each curved path carrier includes a plurality of curved paths, and where each engaging element engages with one of the first and second curved paths of each curved path carrier.

8. The stabilizer arrangement according to claim 7, wherein the transmission further includes a spring element for generating the prestress, the spring being disposed between the shafts so that the prestress rotatably biases the shafts against or towards each other.

9. The stabilizer arrangement according to claim 8, wherein the shafts are linked to the coupling element.

10. The stabilizer arrangement according to claim 7, wherein each curved path, which engages with one of the engaging elements, has an area of a neutral position, and each engaging element rests at least in the area of the neutral position.

11. The stabilizer arrangement according to 10, wherein each engaging element includes a spring-elastically constructed, mutually eccentric bearing for engaging with both sides of the curved path in which the engaging element is disposed.

12. The stabilizer arrangement according to claim 1, wherein at least one of the first and second curved paths has an area of a neutral position, the transmission further comprising at least one of an elastic narrowing and a spring in the area of the neutral positions of the first and second curved path.

13. The stabilizer arrangement according to claim 1, wherein the shaft is linked to the coupling element.

14. The stabilizer arrangement according to claim 1, wherein the engaging element includes at least one roller.

15. The stabilizer arrangement according to claim 1, wherein the driving unit comprises a threaded spindle on which the coupling element is arranged in an axially displaceable manner as a nut.

16. The stabilizer arrangement according to claim 15, wherein the driving unit comprises an electric motor.

17. The stabilizer arrangement according to claim 1, further comprising stabilizer halves that are non-rotatably arranged on the actuator.

18. The stabilizer arrangement according to claim 17, wherein one of the curved path carriers is an outer curved path carrier, and the stabilizer halves are non-rotatably arranged on the outer curved path carrier and the drive.

* * * * *